No. 702,497. Patented June 17, 1902.
W. H. SIMMONS.
FLUID PRESSURE COUPLING.
(Application filed Nov. 8, 1901.)
(No Model.) 2 Sheets—Sheet 2.
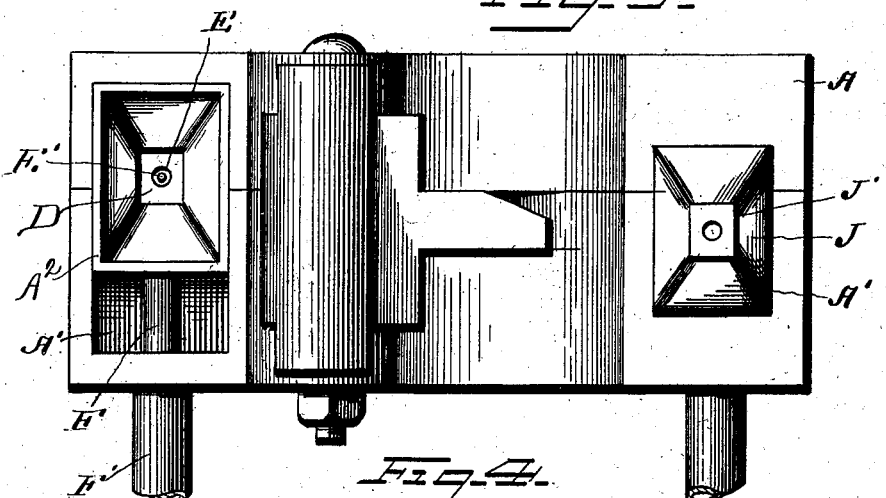
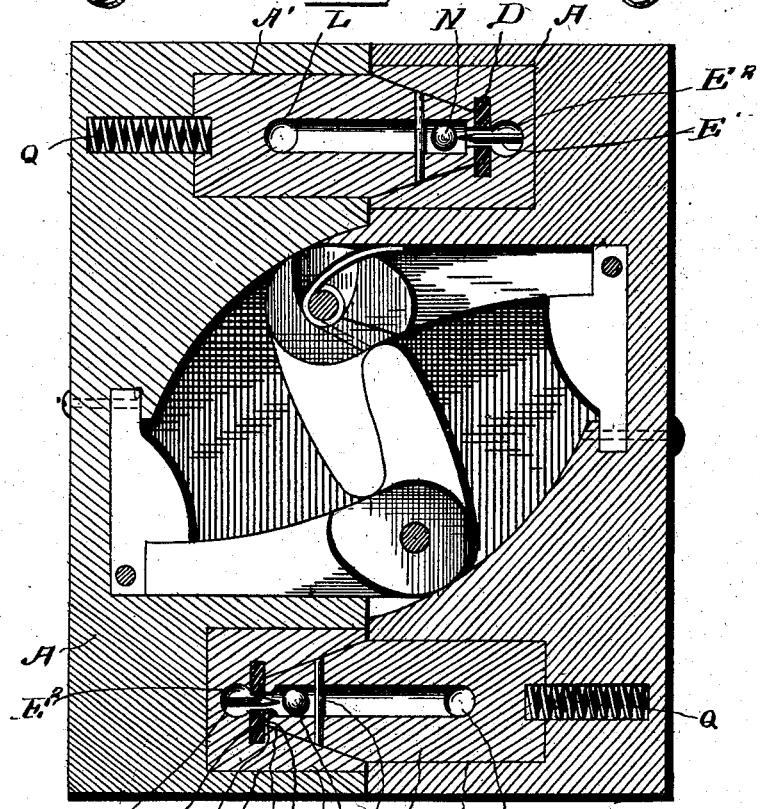
WITNESSES:
R. A. Boswell
Mary R. Tanner
INVENTOR
William H. Simmons
BY
A. L. Hough
Attorney

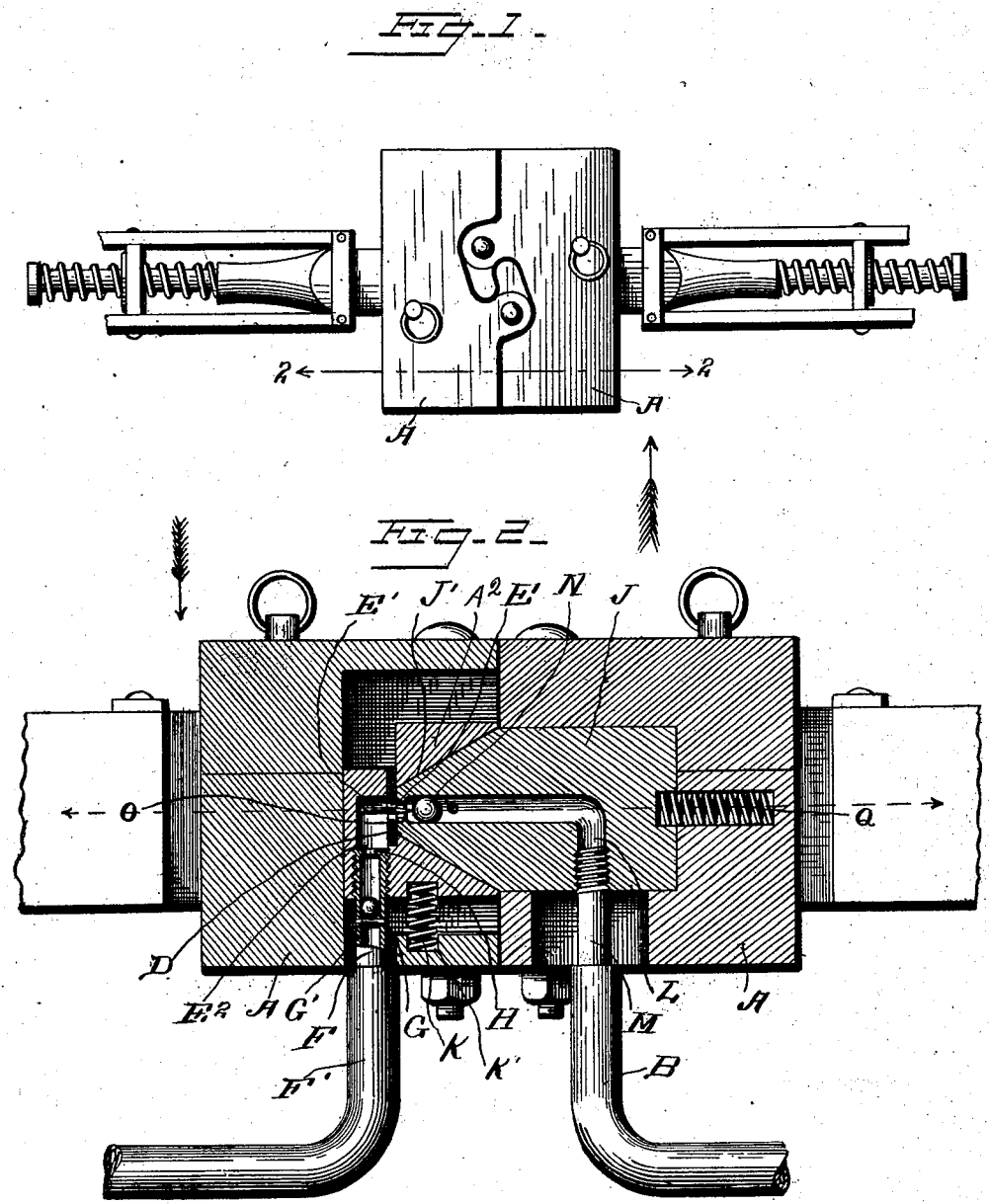

UNITED STATES PATENT OFFICE.

WILLIAM H. SIMMONS, OF ALEXANDRIA, VIRGINIA.

FLUID-PRESSURE COUPLING.

SPECIFICATION forming part of Letters Patent No. 702,497, dated June 17, 1902.

Application filed November 8, 1901. Serial No. 81,593. (No model.)

*To all whom it may concern:*

Be it known that I, WILLIAM H. SIMMONS, a citizen of the United States, residing at Alexandria, in the county of Alexandria and State of Virginia, have invented certain new and useful Improvements in Fluid-Pressure Couplings; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in fluid-pressure couplings for air-brake pipes; and it consists in the provision of means whereby two draw-heads coming in contact with each other will automatically connect the pipe-couplings and when the ends of the coupling are disconnected means being provided to automatically close the passage-way through the coupling ends.

More specifically, the invention consists, in combination with the draw-head of a car-coupler, of spring-actuated boxings which are tapered to receive a coupling-head which is to be connected thereto, valves carried by the coupling-heads adapted to be automatically opened as the couplings are brought together and closed as the couplings are disconnected.

The invention will be hereinafter more fully described and then specifically defined in the appended claims, and is clearly illustrated in the accompanying drawings, which, with the letters of reference marked thereon, form a part of this application, and in which drawings similar letters of reference indicate like parts of the several views, in which—

Figure 1 is a top plan view showing my improved couplers for fluid-pressure pipes locked together. Fig. 2 is a sectional view on line 2 2 of Fig. 1. Fig. 3 is an end elevation of one of the coupling-heads. Fig. 4 is a horizontal sectional view of the coupling-heads fastened together.

Reference now being had to the details of the drawings by letter, A designates a draw-head to which any form of car-coupler may be connected, and on each side of the draw-head are recesses A', one of which contains a boxing $B^2$, which has a recess with tapering walls thereto, the bottom of said recess being a flexible cushion D, and mounted in an aperture E and supported by the rear wall of said boxing is a pin E', which projects through into said recess and through an aperture in said cushion. Said aperture about the pin communicates with a duct $E^2$, entering the boxing from its lower end. Mounted in said passage-way is a pipe F, to the lower end of which pipe connection is made with a tubing F', which communicates with the main pipe running underneath the cars and to the pump in the engine. This tubing contains a ball-valve G, which is normally supported upon a pin G', passed through the wall of said tube at any convenient location, and said ball is adapted to seat against a tapering shoulder H at the upper end of the tube when air-pressure is exerted upon the ball-valve sufficiently to force the same against said seat, thus preventing the escape of air through the aperture about said pin and to the outside atmosphere. Said tubing, which is fastened to and communicates with the passage-way in the boxing, is adapted to reciprocate through an aperture in the bottom wall of the recessed portion in which said boxing is located. A spring K is mounted in a socket member K', and its upper end is adapted to bear against the end surface of said boxing, whereby the latter is allowed to yield in receiving a coupling-head held at different heights.

On the opposite side of the draw-head is a coupling-head J, which is mounted in a similar recessed portion, as described, on the opposite side, said head having a tapered end J', adapted to enter a tapering recess of a box, as described, as two cars with similarly-arranged couplings come together. Said coupling-head J has a duct L leading from the tubing M, which is inserted in said duct, in which is located a ball-valve N. The rearward movement of said ball-valve is limited by means of a pin N', while its outer movement is limited by means of a beveled seat or collar O. A spring Q is interposed between the rear end of said coupling-head J and the rear wall of the recess, in which said head is mounted, which spring is provided to allow a longitudinal movement of the coupling-head when the ends to be coupled come together. To the lower end of the pipe or tubing connected to the coupling-head J is a pipe B, which is connected to the main line before described.

By reason of the boxing having a recess with tapered walls, in which a coupling-head with tapering end comes in contact, it will be observed that the tapering coupling-head will be guided by the tapering walls of the recess in said boxing, and the pin projecting through the bottom of the boxing will be guided through the aperture in the tapering end of the coupling J, thus holding the ball-valve from seating and allowing the air under pressure to be forced through the couplings from one draw-head to the other. By reason of the peculiar construction of my improved couplings it will be observed that provision is made for allowing the cars to turn on curves without impairing the efficiency at all of the coupling.

Having thus described my invention, what I claim to be new, and desire to secure by Letters Patent, is—

1. A fluid-pressure coupling for pipes, comprising in combination with the heads of draw-bars, recessed on opposite sides of its car-coupler a boxing seated in one of said recesses, and a coupling-head in the other, a passage-way leading through said boxing and a pipe communicating with said passage-way, ball-valve in said pipe, and a valve-seat at the inner end of said pipe, a valve-regulated pipe connected to said coupling-head, a valve in the coupling-head, and means carried by said boxing for holding said valve in the coupling-head from seating as two draw-heads similarly equipped with couplings come together, as set forth.

2. A fluid-pressure coupling for pipes, comprising in combination with a draw-head, recessed on opposite sides of the car-coupler mounted on said draw-head, a boxing seated in one of said recesses, said boxing being spring-actuated having a vertical play, a pipe secured to said boxing and having communication with a passage-way therein, a valve in said pipe, a valve-seat near the inner end of said pipe, a coupling-head in the other of said recesses, a pipe secured to said head and communicating with a passage-way in the head, the outer end of the coupling-head being tapered, a ball-valve positioned in said tapering end, and means in said boxing for holding the ball-valve open when two draw-heads equipped with similarly-constructed couplings come together, and the car-couplers for holding the pipe-couplings connected, as set forth.

3. A fluid-pressure pipe-coupling, comprising in combination with the draw-heads of car-couplings, each draw-head having recesses on its coupling edge, a boxing seated in one of said recesses, the outer face of said boxing being recessed and having tapered walls, a cushion forming the bottom of said recess in the boxing, a fixed pin projecting through a central aperture in said cushion with a space about same, a pipe connected to the boxing and communicating with a passage-way therein, the latter leading to the aperture in said cushion, a ball-valve in said pipe, a valve-seat at the inner end of the pipe, a spring on which the boxing is mounted, a coupling-head spring-actuated and seated in the other recess, the outer end of the head being tapered, a valve-seat at the apex of said tapered portion about an aperture in the head, a pipe connected to said head and communicating with a passage-way in the head, which passage-way leads to and communicates through said aperture in the tapered portion of the said pipes adapted to be connected to the main air-supply pipe, as set forth.

In testimony whereof I hereunto affix my signature in presence of two witnesses.

WILLIAM H. SIMMONS.

Witnesses:
A. L. HOUGH,
MARY R. TANNER.